W. G. KIRCHHOFF.
CHANGE SPEED MECHANISM.
APPLICATION FILED FEB. 24, 1913.
1,179,841.
Patented Apr. 18, 1916.
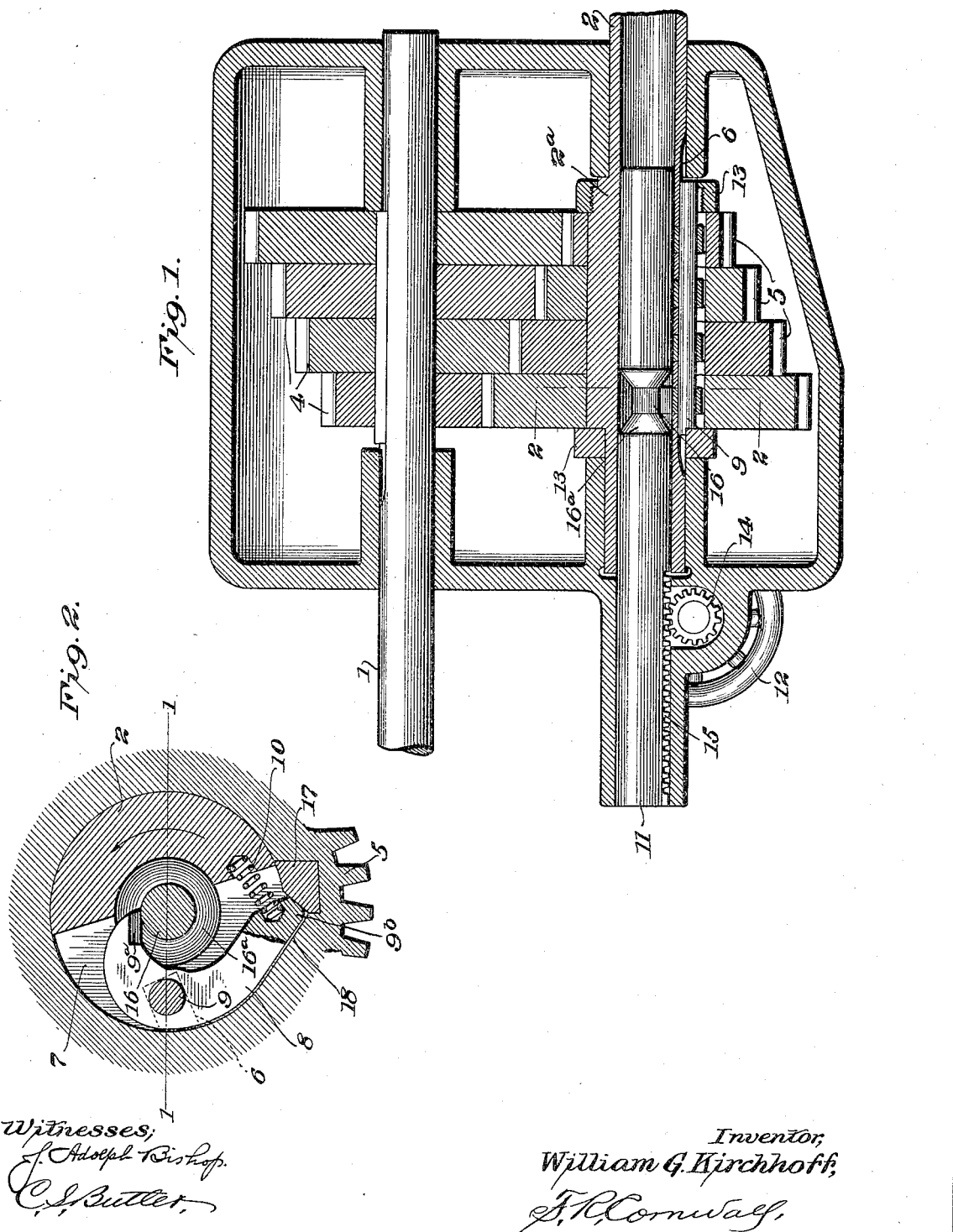
Witnesses:
J. Adolph Bishop.
C. J. Butler.
Inventor,
William G. Kirchhoff,
F. R. Cornwall,
Atty.

UNITED STATES PATENT OFFICE.

WILLIAM G. KIRCHHOFF, OF ST. LOUIS, MISSOURI.

CHANGE-SPEED MECHANISM.

1,179,841.  Specification of Letters Patent.  Patented Apr. 18, 1916.

Application filed February 24, 1913. Serial No. 750,229.

*To all whom it may concern:*

Be it known that I, WILLIAM G. KIRCHHOFF, a citizen of the United States, residing at St. Louis, Missouri, have invented a certain new and useful Improvement in Change-Speed Mechanisms, of which the following is a full, clear, and exact description, such as will enable others skilled in the art to which it appertains to make and use the same, reference being had to the accompanying drawings, forming part of this specification, in which—

Figure 1 is a sectional view of my device taken on a line corresponding to 1—1 of Fig. 2. Fig. 2 is a detail which may be taken on line 2—2 of Fig. 1.

My invention relates to driving mechanism for various forms of machines, and refers more particularly to means for operating and controlling such driving mechanism.

The principal object of my invention is to provide a change speed mechanism which is strong, simple, compact, and easy of operation.

Another object of my invention is to provide a change speed mechanism employing intermeshing gears wherein the shift from a high to a low speed—or vice versa—may be made without engaging any of the intermediate speed gears.

A further object of my invention is to provide a change speed mechanism wherein any one of a plurality of transmission gears may be positively locked to a shaft and the locking means of the associate gears be positively retained in inoperative position.

Other and further objects of my invention will be evident and others pointed out in the following specification with reference to the drawings.

As illustrated in the form shown, my invention contemplates essentially a driven shaft 1 and a driving shaft 2, a plurality of driven gears 4 which are fixed to the driven shaft 1, and a plurality of driving gears 5 which are loosely carried upon the driving shaft 2. Each of gears 4 has a companion gear 5, the two being constantly in mesh. Gears 4 and their companion gears 5 are of varying diameter so as to afford a variety of transmission speeds, as is of common practice.

The portion of the driving shaft 2 involved in the change speed mechanism is formed hollow or tubular and has the portion $2^a$ upon which the gears 5 are carried. The portion $2^a$ of driving shaft 2 is rabbeted to form a channel 6, the cross sectional form and position of which is shown in dotted lines Fig. 2. At points along the channel 6 the driving shaft is also milled transversely to form slots 7. Within the slots 7 are carried hook shaped lock levers 8 which are retained in position in the slots by a pin 9 which lies in the channel 6, and the rings 13 which hold the pin 9 in the channel. The hook shaped levers 8 are adapted to swing on the pin 9, and are formed with a nose portion $9^a$ and a butt portion $9^b$. Extension springs 10 engage the levers 8 and portions of the shaft 2 and tend to swing the butt portions of the levers 8 outwardly of the shaft 2. The contour of the hook shaped levers 8 is such that when their butt portions $9^b$ are forced inwardly of the shaft 2 against the tension of springs 10, said levers will be included entirely within the cross sectional area of shaft 2. However, when the butt portions $9^b$ of levers 8 are forced outwardly by springs 10, the butt portions $9^b$ will project beyond the cross sectional area of shaft 2.

Mounted in shaft 2 and slidable longitudinally therein is a stub shaft 11 which constitutes a shiftable member adapted to operate with the hook shaped locking levers 8. The hand wheel 12 carrying a pinion 14 which meshes with rack 15 on shaft 11. The shaft 11 is milled to form an annular reduced portion 16 having the sloping faces $16^a$. The width of the reduced portion 16 is such as adapts it to receive the nose portion $9^a$ of any one of the levers 8, and when the milled portion 16 is positioned in front of any one of the levers 8, the nose portion $9^a$ of that lever will be forced into the milled portion under the influence of spring 10 which swings the lever 8 upon pin 9. The unmilled portions of shaft 11 by forcing the nose portions of levers 8 outwardly operate positively to hold the butt portions $9^b$ of such levers as are not engaged in the milled portion 16 retracted against their springs 10.

The driving gears 5 are mounted on shaft 2 so that each one is associated with one of the levers 8. As is best shown in Fig. 2, portions of the gears 5 adjacent their inner peripheries are milled out to receive bearing blocks 17 of hard metal which are set into the gears. Portions of the gears 5 adjacent the bearing blocks 17 are also milled out to form the slots or seats 18 which are adapted to receive the butts 9ᵇ of levers 8. When levers 8 are held by shaft 11 with their butts 9ᵇ inward of shaft 2, gears 5 will be permited to rotate freely upon shaft 2. However, when milled portion 16 of shaft 11 is placed opposite any one of levers 8 and nose portion 9ᵃ of that lever drops into milled portion 16, the butt portion 9ᵇ of that lever will be swung outwardly of shaft 2 as above explained, and will engage in the slot or seat 18 of the associate gear 5 with its end abutting against a bearing face of bearing block 17. This position of the selected lever 8 operates to lock its associated gear 5 to shaft 2 so that power from shaft 2 which is revolving in the direction of the arrow shown in Fig. 2 will be transmitted through that gear to the companion gear on the driven shaft and to driven shaft 1. In this fashion, it will be seen that any one of gears 5 may be locked selectively to shaft 2 so that movement of the desired speed may be transmitted from shaft 2 to the driven shaft 1. The operation of changing speeds consists simply in shifting shaft 11 by means of wheel 12 so that milled portion 16 is brought into register with lever 8 of the desired gear 5. The shaft 11 is shifted into and out of engagement with levers 8 quite easily by virtue of the sloping faces 16ᵃ up and down which nose portions 9ᵃ of the levers 8 ride to engage or disengage milled portion 16. By virtue of the form of levers 8 and the fact that a point of engagement between levers 8 and gears 5 is provided at only one point in the inner periphery of the gears, it is possible to shift the milled portion 16 from extreme high to extreme low speed gear without engaging any of the intermediate gears with shaft 2. It is also possible by positioning milled portion 16 between any of the levers to render all of gears 5 free from the driving shaft. The form of levers 8 and the form and location of pin 9 in channel 6 and bearing blocks 17 is such that the stresses from shaft 2 are delivered to pin 9 from an abutting side of channel 6 and thence transmitted longitudinally through levers 8 to bearing blocks 17. This construction, it will be seen, forms a positive lock between shaft 2 and gears 5 through which the power of the driving shaft is directly transmitted. This construction, therefore, forms a very strong means of engaging the gears to the shaft.

It is obvious that my device may be adapted to transmit reverse speeds as well as direct speeds.

From the foregoing description of my device, it will be seen that it forms a very simple, strong, compact, and easily operated mechanism for controlling transmission speeds, and that it is adaptable to any form of machinery for which a change-speed mechanism is desired.

While I have illustrated and described but the single form or embodiment of my invention, I am aware that various modifications in the structure may be made, and, therefore, it is my intention that my invention be constructed to comprehend all such modifications.

I claim:

A transmission gearing comprising an integral hollow shaft having a portion milled out longitudinally to provide a pin seat, a plurality of transmission pinions mounted on said shaft, a plurality of locking members mounted on the pin carried in said pin seat and disposed wholly within the cross sectional area of said shaft, one of said locking members being adapted to coöperate with each of said pinions, means coöperating with said shaft at either end of said pin to hold the same in position, and means within said shaft for coöperating selectively with the locking members to lock their associated pinions to the shaft.

In testimony whereof I hereunto affix my signature in the presence of two witnesses, this 11th day of February, 1913.

WILLIAM G. KIRCHHOFF.

Witnesses:
C. S. BUTLER,
M. C. GEISSERT.